United States Patent [19]
Braams

[11] Patent Number: 5,982,874
[45] Date of Patent: Nov. 9, 1999

[54] TRANSMISSION SYSTEM WITH IMPROVED TONE DETECTION

[75] Inventor: Harm Braams, Nieuwegein, Netherlands

[73] Assignee: U.S. Philips Corporation, New York, N.Y.

[21] Appl. No.: 08/788,721

[22] Filed: Jan. 23, 1997

[30] Foreign Application Priority Data

Jan. 26, 1996 [EP] European Pat. Off. .............. 96200176

[51] Int. Cl.$^6$ ................................... H04M 1/50
[52] U.S. Cl. .......................... 379/350; 379/283; 379/386
[58] Field of Search ................... 379/350, 282, 379/283, 386, 351, 6, 286; 370/526; 364/724.09; 375/340, 343; 381/56; 324/76.13; 84/616, 654, 681, 450

[56] References Cited

U.S. PATENT DOCUMENTS

| | | | |
|---|---|---|---|
| 3,882,283 | 5/1975 | Proudfoot | 379/282 |
| 4,085,295 | 4/1978 | Goto et al. | 379/386 |
| 4,395,595 | 7/1983 | Nishitani et al. | 379/386 |
| 4,868,872 | 9/1989 | Roberts et al. | 379/386 |
| 5,119,322 | 6/1992 | Stroobach | 364/724 |
| 5,214,693 | 5/1993 | Chujo | 379/386 |
| 5,619,564 | 4/1997 | Canniff et al. | 379/386 |
| 5,649,002 | 7/1997 | Brady et al. | 379/142 |
| 5,694,466 | 12/1997 | Xie et al. | 379/386 |

FOREIGN PATENT DOCUMENTS

0689366A1  5/1995  European Pat. Off. ........ H04Q 1/457

*Primary Examiner*—Forester W. Isen
*Assistant Examiner*—Jacques M. Saint-Surin
*Attorney, Agent, or Firm*—Jack D. Slobod

[57] ABSTRACT

In a transmission system a pair of signalling tone signals is transmitted by a transmitter (2) to a receiver (6) via a transmission channel (4). In the terminal (6) a tone detector is used to detect the presence of the pair of signalling tone signals. In order to improve the reliability of the tone detector in the case of differing strength of both tone signals, the decision on the presence of the pair of signalling tone signals is based on a combined strength measure which is determined by an adder (23). The combined strength measure is compared with a reference level $TH_2$. In a further embodiment, also a check on the level of the individual tone signals is done with comparators (11) and (9), in order to specify the maximum strength difference tolerated.

4 Claims, 6 Drawing Sheets

TRANSMISSION SYSTEM WITH IMPROVED TONE DETECTION

BACKGROUND OF THE INVENTION

1. Field of the Invention

The invention is related to a transmission system comprising a transmitter for transmitting simultaneously a plurality of tone signals via a transmission medium to a terminal, the terminal comprising strength measuring means for deriving tone strength measures for said plurality of tone signals.

The invention is also related to a terminal, a tone detector and a method for tone detection.

2. Description of the Related Art

A transmission system according to the preamble is known from U.S. Pat. No. 3,882,283.

The transmission system according to the present invention can be applied in systems using multi tone transmission. This means that information is transmitted by presenting simultaneously a plurality of tone signals to a channel. The receiver can recover the information by detecting the presence of a combination of tone signals.

A first application of such a transmission system is the so-called DTMF signalling system, which is in widespread use for transmitting dialling information from a telephone terminal to a telephone exchange. In this system a digit is transmitted by presenting two tone signals to the transmission medium. One of said tone signals is chosen from a first group of four tone signals and the second tone is chosen from a second group of four tone signals. The frequencies of the tone signals in the first group (low frequency group) are lower than the frequencies of the tone signals in the second group (high frequency group). The receiver has to determine which pair of tone signals is transmitted by the receiver in order to recover the transmitted digit.

A further application of the present invention is the detection of the so-called CAS tone in screen phones. Recently, telephone terminals provided with a display have become available. These telephone terminals are arranged to operate according to the Analog Display Service Interface standard (ADSI). Said standard enables the transmission of data in addition to the transmission of speech signals to and from the telephone terminal.

In order to distinguish between speech and data, a so called CAS-signal (CPE Alerting Signal) is transmitted by the transmitter to indicate that a data signal will be transmitted. The CAS signal is constituted by two tone signals having a frequency of 2130 Hz and 2750 Hz, which are transmitted simultaneously during 80 msec.

The terminal of the transmission system according to the above mentioned U.S. patent, comprises for each of the tone signals to be detected a strength measuring device which generates a tone strength measure for the corresponding tone. This tone strength measure can e.g. be the amplitude or the power of the tone. If the strength measure of a tone exceeds a threshold, said tone is regarded to be present. A predetermined tone combination is regarded as present if all individual tone signals of this combination are regarded to be present.

Due to imperfections of the transmission medium, it can occur that the individual tone signals at the receiver differ in strength. The ratio between the strength of the individual tone signals is often referred to as twist. In order to be able to detect a combination of tone signals having some twist, the threshold for detecting the presence of a tone signal has to be lowered. This lowering of the threshold results into an increased probability of regarding noise signals as the tone to be detected, making the detection of the tone signal combination less reliable.

OBJECT AND SUMMARY OF THE INVENTION

The object of the present invention is to provide a transmission system according to the preamble which allows a more accurate detection of tone combinations in the presence of twist.

Therefor the transmission system according to the invention is characterised in that the terminal comprises decision means for deciding the presence of a plurality of tone signals if a combined strength measure of the plurality of tone signals exceeds a threshold value.

By deciding the presence of the plurality of tone signals on the basis of a combined strength measure of the tone signals involved, higher threshold values are involved with the decision on the presence of the tone combination. The result of this larger threshold value, is a reduced probability of noise signals being regarded as the tone signal to be detected. A first way to realise the present invention is to combine the strength signals into a combined strength signal, and to compare the value of this combined strength signal with a threshold value. A second way to realise the present invention is to compare the strength of individual tone signals with a threshold which is dependent on the strength of the other tone signals involved. In the second case no combined signal has actually to be derived, but the decision that the combination of tone signals is present is still taken if a combined strength measure exceeds a threshold signal.

A further embodiment of the invention is characterised in that the decision means are arranged for deciding the presence of a plurality of tone signals if the combined tone strength measure exceeds a first threshold and the individual tone strength measures involved exceed a second threshold.

If besides the combined strength measure also the individual strength measures are compared with a threshold, it is possible to prescribe accurately which twist value is tolerated. The larger the threshold for the individual strength measures is set, the smaller is the tolerated twist.

BRIEF DESCRIPTION OF THE DRAWING

The invention will now be explained more in detail with reference to the drawing, which shows in.

DETAILED DESCRIPTION OF THE PREFERRED EMBODIMENTS

Figure 1:
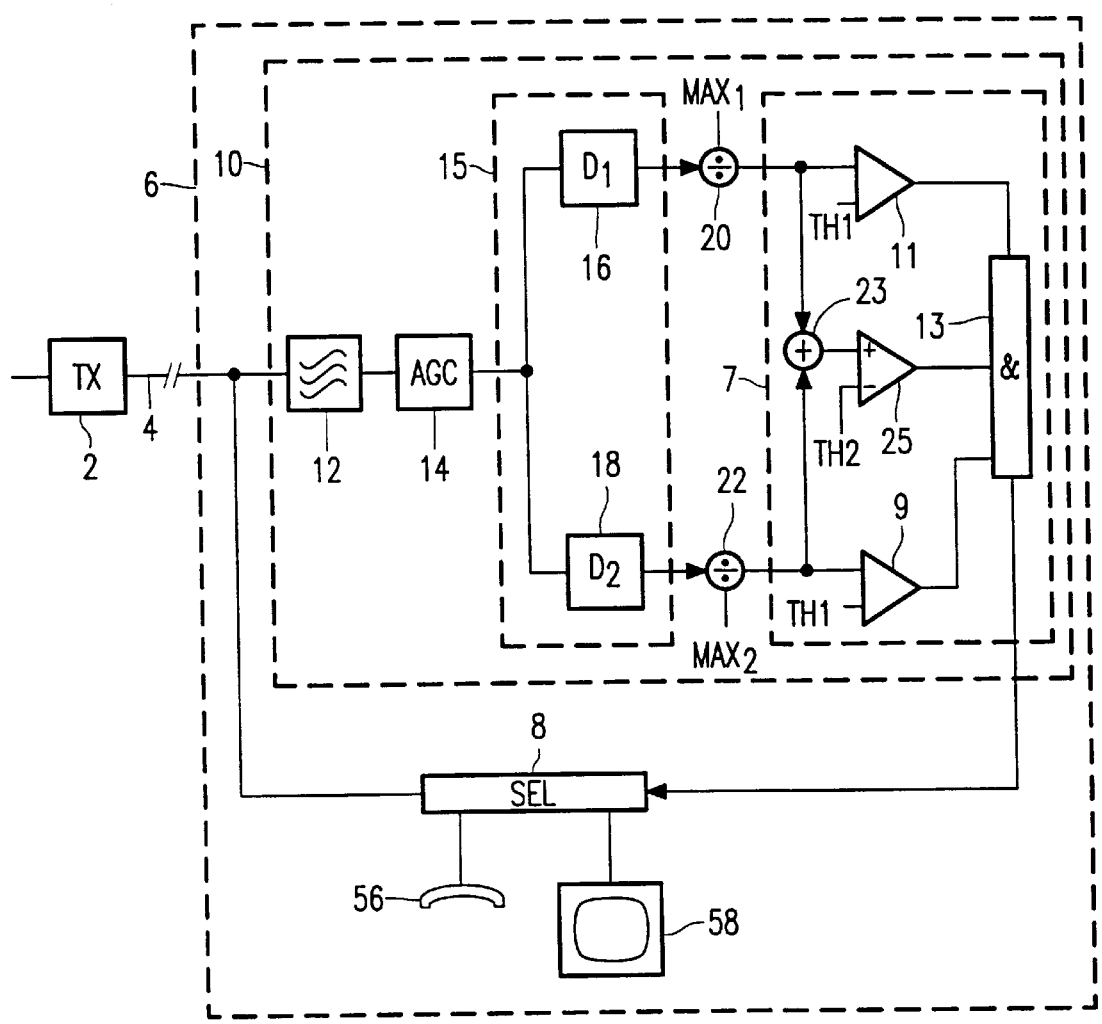
FIG. 1, a transmission system according to a first embodiment of the invention.

In the transmission system according to FIG. 1, a signal to be transmitted is applied to a transmitter 2. The output of the transmitter 2 carries the signal to be transmitted, possibly in combination with a signalling tone. This output is coupled to a terminal 6 via a transmission channel 4. The input of the terminal 6 is connected to an input of a selector 8 and to an input of a tone detector 10.

The input of the tone detector 10 is connected to an input of a low pass filter 12. The output of the low pass filter 12 is connected to an AGC circuit 14. The output of the AGC circuit 14 is connected to an input of the strength measuring means 15. The input of the strength measuring means 15 is connected to a first input of a first tone strength measuring device 16 and to an input of a second tone strength measuring device 18.

The output of the first tone strength measuring device 16 is connected to first input of a divider 20. A signal $MAX_1$, representing the maximum value of the output signal of the strength measuring device 16, is connected to a second input of the divider 20.

The output of the second tone strength measuring device 18 is connected to a first input of a divider 22. A signal $MAX_2$, representing the maximum value of the output signal of the strength measuring device 18, is connected to a second input of the divider 22.

The output of the divider 20 is connected to a first input of the decision means 7. The first input of the decision means 7 is connected to a first input of a comparator 11 and to a first input of an adder 23. The output of the divider 22 is connected to a second input of the decision means 7. The second input of the decision means 7 is connected to a first input of a comparator 9 and to a second input of an adder 23. The output of the adder 23 is connected to a first input of a comparator 25. A first reference signal $TH_1$ is applied to a second input of the comparator 11 and to a second input of the comparator 9. A second reference signal $TH_2$ is applied to a second input of the comparator 26.

An output of the comparator 11, the comparator 25 and the comparator 9 are connected to a corresponding input of an AND gate 13. The output of the AND gate 13 is connected to a control input of the selector 8. A telephone handset and an LCD screen 58 are connected to the selector 8.

In the transmission system according to FIG. 1 the data to be transmitted, is transmitted by the transmitter 2 via the transmission medium 4 to the terminal 6. In the terminal 6 the transmitted data received by the terminal 6 is applied to the telephone handset 56 or to the (LCD) display 58 in dependence of the reception of two signalling tones. A changeover is made after the signalling tone signals are detected by the tone detector 10.

The received signal is filtered by the low pass filter 12 to eliminate interfering signals like noise and speech outside the frequency range corresponding to the signalling tone to be detected. The AGC circuit provides an output signal having a constant output power to the input of the tone strength measuring devices 16 and 18.

The strength measuring device 16 is arranged for generating a strength measure for the first tone, and the strength measuring device 18 is arranged for generating a strength measure for the second tone. In the case of a CAS signal used in the above mentioned ADSI standard, the first tone has a frequency of 2130 Hz and the second tone has a frequency of 2750 Hz. The output signal of the tone strength measuring device 16 is normalized by the divider 20 with respect to the maximum possible output signal of said tone strength measuring device 16. This means that the output of the divider 20 varies between 0 and a predetermined constant value. This normalization is done in order to obtain strength measures having the same range for both tone signals irrespective of (frequency determined) differences between the strength signals from the strength measuring devices 16 and 18.

At the output of the adder 23, the combined strength measure is available. The comparator 25 compares the combined strength measure with the reference value $TH_2$. The comparators 27 and 31 compare the strength measures at the outputs of the dividers 20 and 22 respectively with the reference value $TH_1$. If it is assumed that the maximum output signal of the dividers 20 and 22 is equal to 1, suitable values for the threshold value $TH_1$ and $TH_2$ are 0.24 and 0.8 respectively. Only if all three threshold values are exceeded, the tone pair is regarded as present by the AND gate 13, resulting in an improved reliability of the decision.

It is observed that it is possible to dispense with the comparators 11 and 9. This will lead to less accurate limits set on the required value of the individual strength measures, but there is still the advantage of an improved reliability of the detection due to the higher value of $TH_2$.

Figure 2:
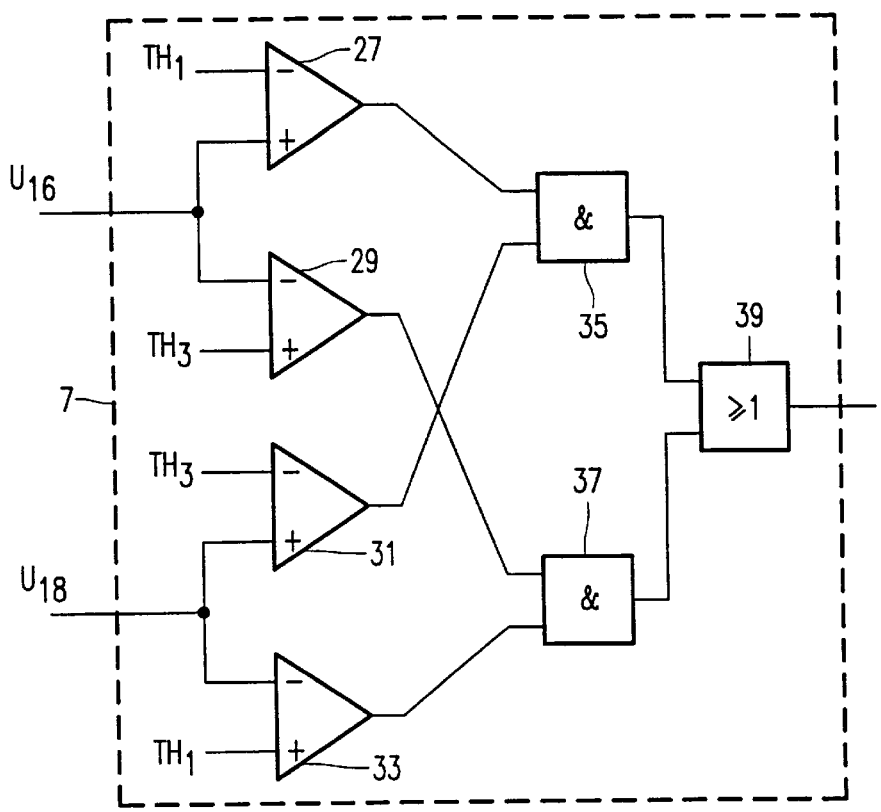
FIG. 2, a decision element 7 according to a further embodiment of the invention.

In the decision circuit 7 according to FIG. 2, the first input is connected to a first input of a comparator 27 and to a first input of a comparator 29. A second input of the decision circuit 7 is connected to a first input of a comparator 31 and to a first input of a comparator 33. A first reference signal $TH_1$ is applied to a second input of the comparator 27 and to a second input of the comparator 33. A third reference signal $TH_3$ is applied to a second input of the comparator 29 and to a second input of the comparator 31.

The output of the comparator 27 is connected to a first input of an AND gate 35 and the output of the comparator 31 is connected to a second input of the AND gate 35. The output of the comparator 29 is connected to a first input of an AND gate 37 and the output of the comparator 31 is connected to a second input of the AND gate 37. The output of the AND gate 35 is connected to a first input of an OR gate 39, and the output of the AND gate 37 is connected to a second input of the OR gate 39. The output of the OR gate 39 constitutes the output of the decision means 7.

In the decision circuit according to FIG. 2 it is assumed that the reference value $TH_1$ is substantially smaller than $TH_3$. Possible values of $TH_1$ and $TH_3$ are 0.2 and 0.4–0.5 respectively. The output of the AND gate 35 will be "1" if and only if the normalized strength measure $U_{16}$ exceeds $TH_1$ and the normalized strength measure $U_{18}$ exceeds $TH_3$. The output of the AND gate 37 will be "1" if and only if the normalized strength measure $U_{18}$ exceeds $TH_1$ and the normalized strength measure $U_{16}$ exceeds $TH_3$. This means that the output of one of the AND gates 35 or 37 is "1" if the strength of one of the tone signals exceeds a value 0.8 and the other one exceeds 0.2. Consequently the output of the OR gate 39 will be "1" under these conditions. The reliability of the detection of the tone pair has substantially increased with respect to the prior art device, because in the prior art device it was necessary to set the threshold value for both tone signals on the same low level (e.g. 0.2). It is observed that in case the tone pair is detected by the decision circuit according to FIG. 3, the combined tone strength measure is larger than 1. Consequently the decision means according to FIG. 3 operates on basis of the combined strength measure without actually calculating it.

Figure 3:
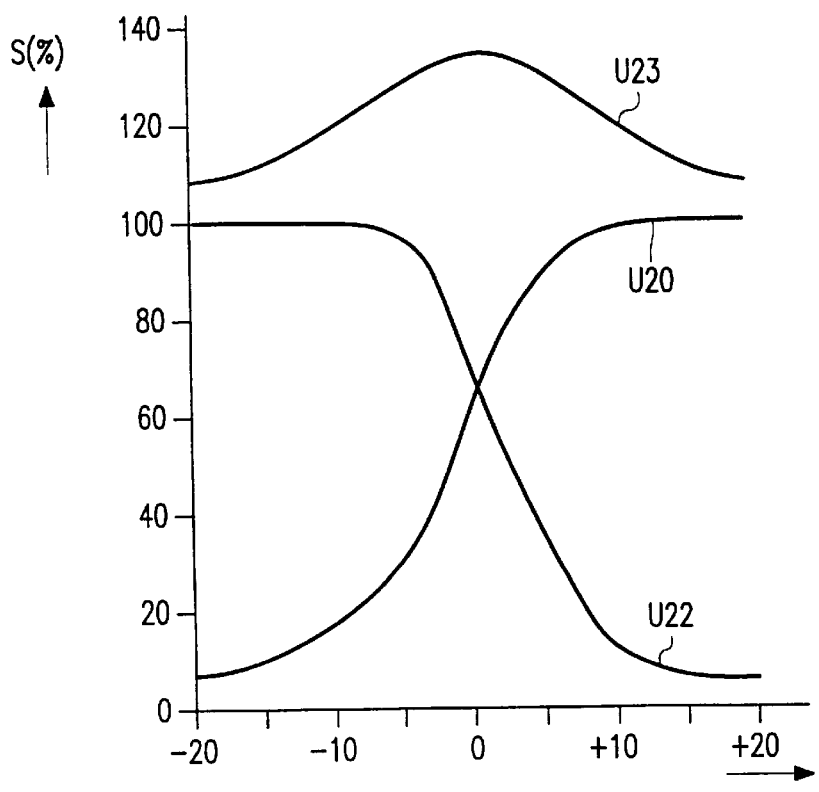
FIG. 3, the output signals of the strength measuring devices 16 and 18 as function of the twist.

FIG. 3 shows the first normalized strength signal $U_{20}$, the second normalized output strength signal $U_{22}$ and the sum of the first and the second normalized strength signals. These normalized strength signals are calculated by the divider 20, the divider 22 and the adder 23 respectively. From FIG. 3 it can be seen that in the case of a zero twist value the normalized strength signals $U_{20}$ and $U_{22}$ both have a value of 0.64. The sum of these signals is 1.32. A suitable threshold value $TH_2$ is 0.8, and a suitable threshold value $TH_1$ is 0.21. With these choices a twist of 6 dB is tolerated by the tone detector. If only the combined threshold signal is compared with a reference value, this reference value has to be larger than 1, in order to prevent detection of a single tone as the combination of tone signals. A suitable choice could be a value of 1.2.

Figure 4:
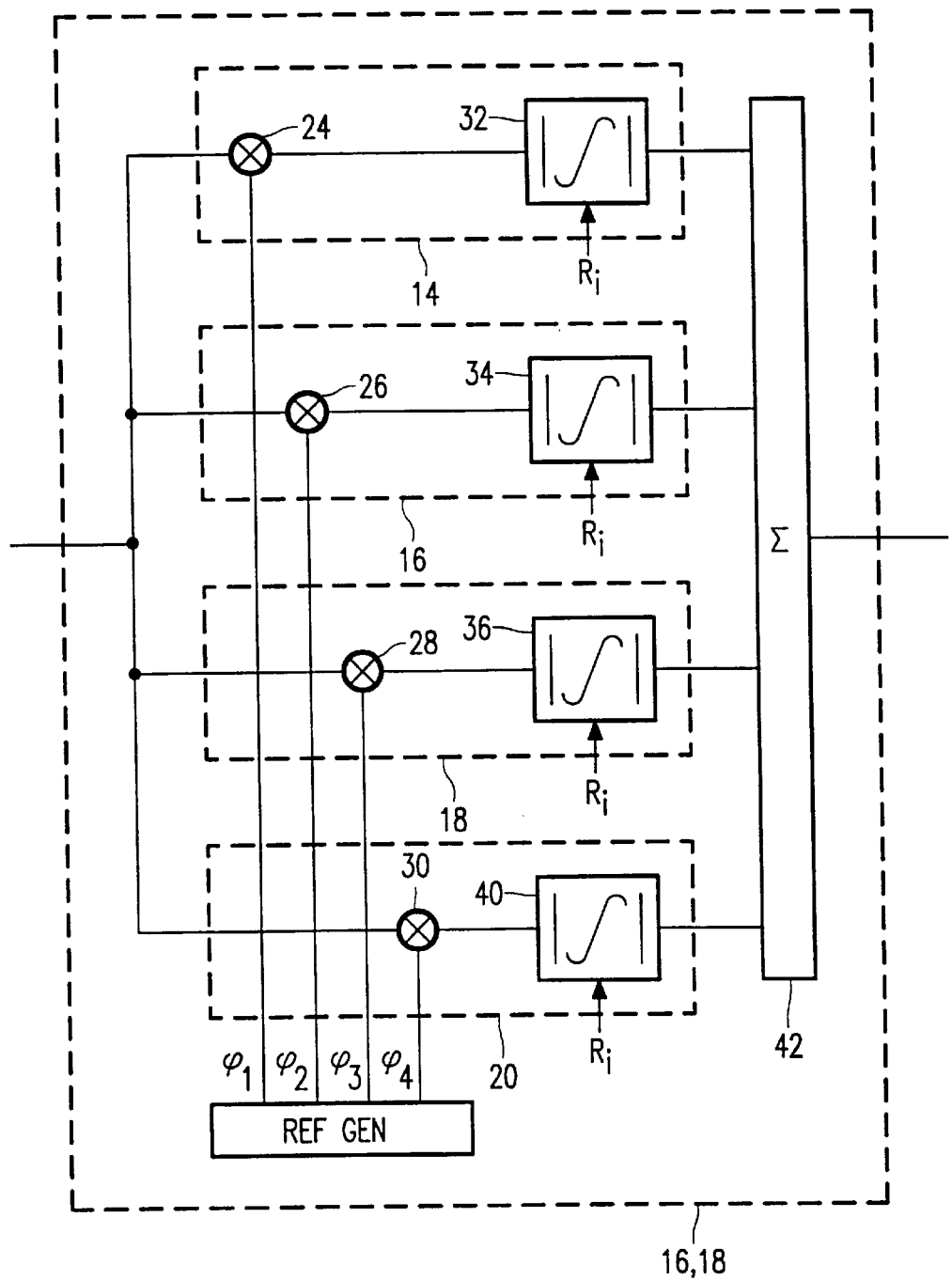
FIG. 4, a first embodiment of the strength measuring devices 16 and 18.

In the strength measuring device according to FIG. 4 the input is connected to an input of correlating elements 14, 16, 18 and 20. The strength measuring device according to FIG. 4 is described in European patent application No. 95200996.7-2209, which corresponds to allowed U.S. patent application Ser. No. 08/632,868. The input of the correlating element 14,[16,18,20] is connected to a first input of a multiplier 24,[26,28,30], the output of which is connected to an integrator 32,[34, 36,38]. An output of a reference generator, carrying output signal $\phi_1$,[$\phi_2$,$\phi_3$,$\phi_4$] is connected to a second input of the multiplier 24,[26,28,30].

The outputs of the correlating elements 14, 16, 18 and 20, carrying correlation signals, are constituted by the outputs of the integrators 32, 34, 36 and 40 respectively. These outputs are connected to corresponding inputs of an adder 42. The output of the adder 42 constitutes the output of the strength measuring device 16, 18.

In the correlating elements 14, 16, 18 and 20, of the strength measuring device 16, 18 according to FIG. 4, the input signal is multiplied with a corresponding reference signal having phase $\phi_1$, $\phi_2$,$\phi_3$ and $\phi_4$. The frequency of the reference signal corresponds to the frequency of the signalling tone to be detected. The integrators 32, 43, 36 and 40 determine the integrated value of the output signal of the corresponding multiplier 24, 26, 28 and 30 respectively, and determine subsequently the absolute value of said integrated value. The output signals of the integrators 32, 34, 36 and 40 are added by the adder 42 to a combined correlation signal. A combined correlation signal substantially different from zero will be present if the input signal comprises a signalling tone with a frequency corresponding to the frequency of the reference signal. The tolerated frequency difference depends on the measuring time used. This measuring time used is defined by the time between two subsequent reset instants of the integrators 32 . . . 40. A finite measuring time $t_m$ results in a rectangular window function applied to the output signal of the multipliers. This window functions corresponds in the frequency domain to a filter function according to:

$$H(f) = \frac{\sin(2\pi t_m |f - f_c|)}{2\pi t_m |f - f_c|} \quad (1)$$

The transfer function according to (1) shows a main lobe having width equal to $1/t_m$, leading to a bandwidth of approximately $1/t_m$. By choosing a suitable value for the measuring time, every desired frequency resolution can be obtained. Because the measuring time $t_m$ can easily be changed, the frequency resolution can easily be changed too.

By using four reference signals having a phase incrementing by $\pi/4$, always a major correlation signal is generated, irrespective of the phase of the reference tone. It can be shown that the amplitude variation of the combined correlation signal as function of the phase of the signalling tone, is not more than 10%.

The output signal of the adder 42 constitutes the output of the tone signal strength measuring device.

It is conceivable that the correlated signals to be added are obtained by weighting the correlation signals with a factor dependent on the actual correlation value. This weighting is equivalent to performing a non linear operation on the correlation signal. Using such weighting results in a decreased influence of a correlation signal having a small magnitude, which can be corrupted by noise.

The value MAX to be applied to the dividers 20 and 22 in FIG. 1, is proportional to the ratio between the measuring time $t_m$ and the integration time constant.

Figure 5:
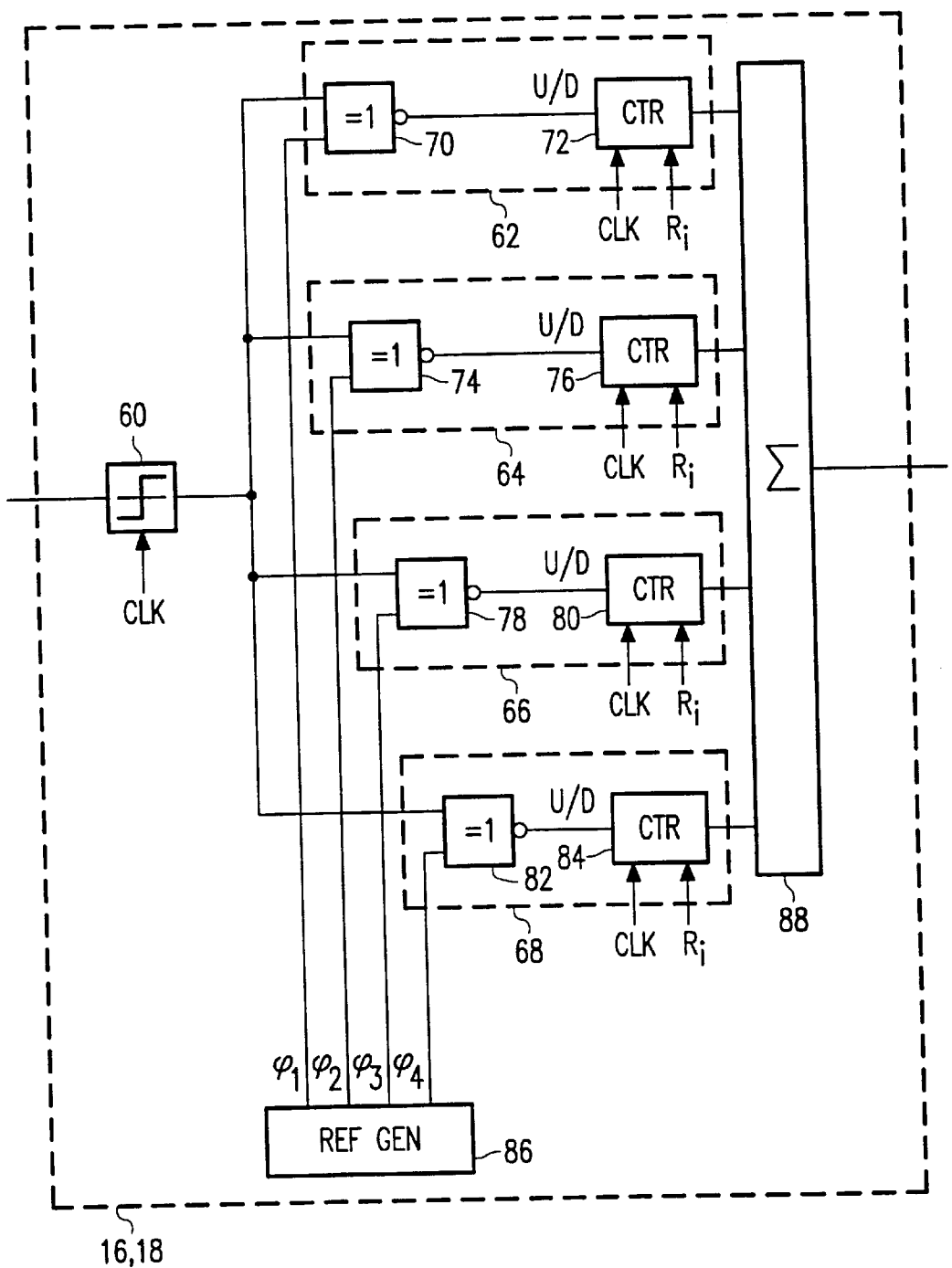
FIG. 5, a second embodiment of the strength measuring devices 16 and 18.

In the digital strength measuring device 16, 18 according to FIG. 5, the input signal is applied to an input of a slicer 60. The strength measuring device according to FIG. 5 is described in the aforementioned European patent application No. 95200996.7-2209. The output of the slicer 60 is connected to an input of the correlator constituted by the correlating elements 62, 64, 66 and 68. Said input of the correlating elements 62, 64, 66, 68 is connected to a first input of an exclusive NOR gate 70, 74, 78 and 82 respectively. Second inputs of the exclusive NOR gates 70, 74, 78 and 82 are connected to corresponding outputs of a reference signal generator 86, carrying output signals $\phi_1$, $\phi_2$,$\phi_3$ and $\phi_4$. The output of the exclusive NOR gate 70 [74,78,82] is connected to an UP/DOWN control input of an up-down counter 72 [76,80,84]. To each of the up-down counters 72, 76, 80 and 84 a clock signal and a reset signal are applied. The outputs of the up-down counters 72, 76, 80 and 84, each carrying an output signal corresponding to the absolute value of the count value, are connected to an input of an adder 88. The output of the adder 88 constitutes the output of the strength measuring device. It is observed that if a tone strength measuring device according to FIG. 5 is used, the AGC circuit in FIG. 1 can be dispensed with.

The input signal of the tone strength measuring device 16, 18 is converted into a binary signal by the slicer 60. The output signal of the slicer 60 is compared in each of the correlating elements 62, 64, 66 and 68 to a corresponding binary reference signal generated by the reference signal generator 86. The reference signals generated by the reference signal generator have a mutual phase difference of $\pi/4$. The comparison of the output signal from the slicer 60 to the reference signals is performed by the exclusive NOR gates 70, 74, 78 and 82. The output signal of an exclusive NOR gate has a logical value "0" if both input signals have a different logical value, and has a logical value "1" if both input signals have an equal logical value.

The output signals of the respective exclusive NOR gates 70, 74, 78 and 82 control the counting direction of corresponding up-down counters 72, 76, 80 and 84. If the output signal of the slicer has the same logical value as the reference signal, the up-down counter will increase its count at every clock pulse. If the output signal of the slicer has a logical value differing from the logical level of the reference signal, the up-down counter will decrease its count at every clock pulse. If the reference signal has approximately the same phase and frequency as the output signal of the slicer, the count of the up-down counter will rapidly increase, indication a large (positive) correlation value. If the reference signal has approximately the same frequency as the output signal of the slicer 60, but is opposite in phase with respect to the output signal of the slicer 60, the count of the up-down counter will rapidly decrease, indication a large (negative) correlation value. If there is no correlation between the reference signal and the output signal of the slicer 60, the output signal of the exclusive NOR gate will more or less randomly assume the logical value "0" or "1". This means that the up-down counter will increase and decrease its count in a random fashion, leading to an average count of zero.

The absolute values of the counts of the up-down counters 72, 76, 80 and 84 are summed periodically by the adder 88 and passed to the output of the tone strength measuring device. After the addition of the absolute values of the counts, the up-down counters 72, 76, 80 and 84 are reset by a reset signal R.

The clock frequency is in general a multiple of the frequency of the tone to be detected. This results in an improved suppression of interfering components in the output signals of the slicer 60. If the output signal of the slicer 60 sometimes has a wrong logical value due to an interfering signal, in half of the cases a "0" is changed in a "1", and in half of the cases a "1" is changed in a "0". These errors tend to have an average value of zero if a large number of clock cycles is present per period of the reference signal.

The output signal of the tone strength measuring device is proportional to the measuring time $t_m$ and the clock frequency $f_{clk}$. Consequently, the value of MAX to be applied to the dividers 20 and 22 in FIG. 1 has to be proportional to the product of $t_m$ and $f_{clk}$.

Figure 6:
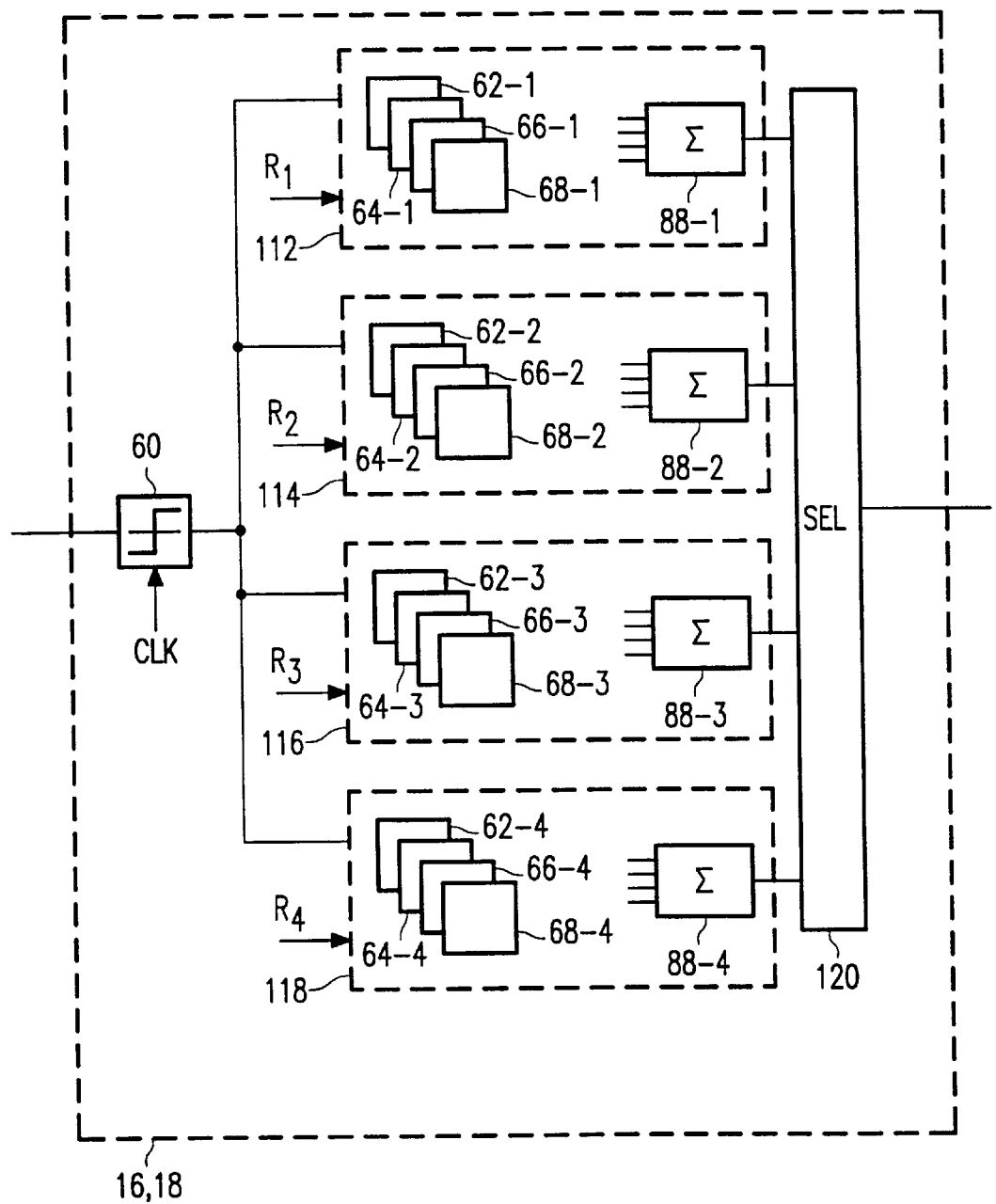
FIG. 6, a third embodiment of the strength measuring devices 16 and 18.

In the strength measuring device according to FIG. 6, an input signal is applied to an input of a slicer 60. The strength measuring device according to FIG. 6 is described in European patent application No. 95200988.4-2209, which corresponds to allowed U.S. patent application Ser. No. 08/632,937. The output of the slicer 60 is connected to four correlators 112, 114, 116 and 118. Each of the correlators comprises four correlating elements 62, 64, 66 and 68 and an adder 88. The correlating elements in each of the correlators can be constructed in the same way as the correlating elements in FIG. 4 or FIG. 5. To each of the correlators 112, 114, 116 and 118 a corresponding reset signal $R_1, R_2, R_3$ and $R_4$ is applied. These reset signals are not applied simultaneously, but are distributed regularly in time. The output signals of the correlators 112, 114, 116 and 118 are connected to inputs of a selector 120. The output of the selector 120 is connected to a first input of a comparator 122. A threshold value THR is applied to a second input of the comparator 122. The output of the comparator 122 is the output of the tone detector 10.

The strength measuring device according to FIG. 6 can be used if the arrival time of the tone is not known beforehand. The strength measuring device comprises a number of correlators which are in the measuring state during mutually displaced measuring periods. In this way there is always at least one correlator which is in the measuring state during the presence of a signalling tone. A condition for this is that the duration of the tone does not exceed the overlap between the measuring periods of two correlators which are reset consecutively.

The selector 120 determines the content of the adder of a correlator at the end of the measuring period and passes this value to the output of the strength measuring device. Subsequently the correlator is reset. This evaluation and resetting of the correlator is performed cyclically.

Figure 7:
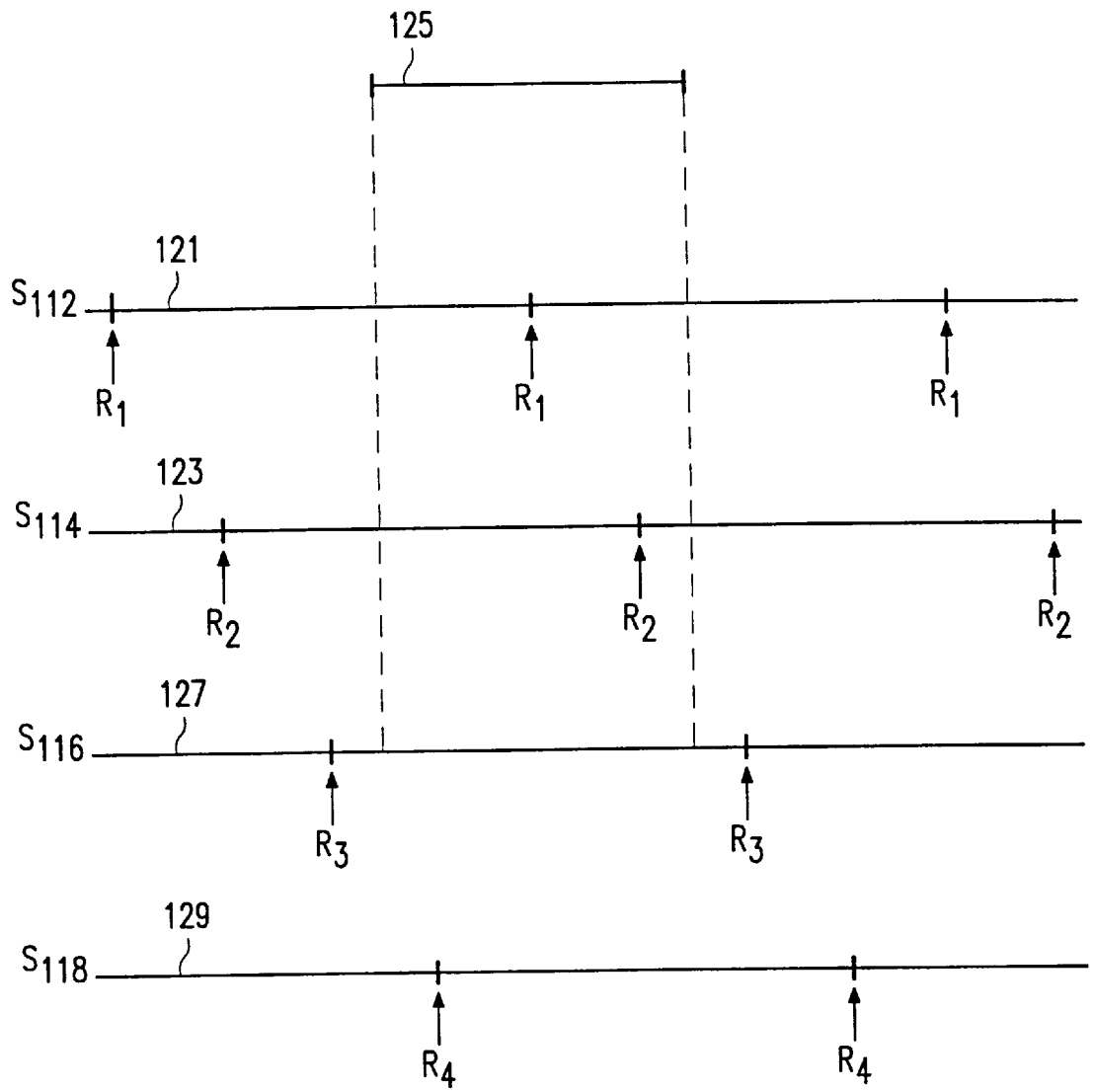
FIG. 7, a timing diagram showing important signals of the embodiment according to FIG. 6.

FIG. 7 shows the timing of the evaluation and resetting of the correlators in the tone detector according to FIG. 6. In graph 121 of FIG. 7 the timing of the reset signal $R_1$ applied to the correlator 112 is shown. In graphs 123, 127 and 129 the timing for the reset signals $R_2$, $R_3$, and $R_4$ for the correlators 114, 116 and 118 is shown. From FIG. 7 it is clear that the correlators are evaluated and reset in a cyclic fashion. It can also be seen that there is always one correlator in the measuring state during the presence of a signalling tone of the duration indicated by graph 125, irrespective of the timing of the signalling tone. In general for the relation between the reset interval (or measuring period) $T_m$ and the duration $T_{tone}$ of the signalling tone to be detected can be written:

$$T_m = \frac{n}{n-1} T_{tone} \qquad (2)$$

In (2) n is the number of correlators. From (2) it can be seen that the difference between the measuring period and the tone duration decreases if the number of correlators increases. The advantage of having a measuring time in the range of the tone duration is that the measurement is only performed if a tone is present. This results in the elimination of a noise contribution to the output signal of the correlator during absence of the tone to be detected. This leads to a more reliable detection of the signalling tone.

I claim:

1. A transmission system comprising a terminal and a transmitter for transmitting simultaneously a plurality of tone signals via a transmission medium to the terminal, said terminal comprising:

strength measuring means for deriving tone strength measures for said plurality of tone signals; and decision means for deciding on the presence of a plurality of tone signals if a combined strength measure of the plurality of tone signals exceeds a first threshold value, and individual strength measures of the tone signals involved exceed a second threshold value, said first threshold value being greater than the product of the number of tones in said plurality times the second threshold.

2. A terminal for receiving a simultaneously transmitted plurality of tone signals, said terminal comprising:

strength measuring means for deriving tone strength measures for said plurality of tone signals; and decision means for deciding on the presence of a plurality of tone signals if a combined strength measure of the plurality of tone signals exceeds a first threshold value, and individual strength measures of the tone signals involved exceed a second threshold value, said first threshold value being greater than the product of the number of tones in said plurality times the second threshold.

3. A tone detector for detecting the presence of a plurality of tone signals in an input signal, said tone detector comprising:

strength measuring means for deriving tone strength measures for said plurality of tone signals; and decision means for deciding on the presence of a plurality of tone signals if a combined strength measure of the plurality of tone signals exceeds a first threshold value, and individual strength measures of the tone signals involved exceed a second threshold value, said first threshold value being greater than the product of the number of tones in said plurality times the second threshold.

4. A method for receiving a simultaneously transmitted plurality of tone signals, said method comprising:

deriving a tone strength measure for each one of said plurality of tone signals; and deciding on the presence of a plurality of tone signals if a combined strength measure of the plurality of tone signals exceeds a first threshold value, and individual strength measures of the tone signals involved exceed a second threshold value, said first threshold value being greater than the product of the number of tones in said plurality times the second threshold.

* * * * *